(12) United States Patent
Otani et al.

(10) Patent No.: US 11,323,590 B2
(45) Date of Patent: May 3, 2022

(54) IMAGE PROCESSING APPARATUS, IMAGE FORMING APPARATUS, IMAGE PROCESSING METHOD, AND STORAGE MEDIUM

(71) Applicant: CANON KABUSHIKI KAISHA, Tokyo (JP)

(72) Inventors: Ryosuke Otani, Tokyo (JP); Hisashi Ishikawa, Urayasu (JP)

(73) Assignee: CANON KABUSHIKI KAISHA, Tokyo (JP)

(*) Notice: Subject to any disclaimer, the term of this patent is extended or adjusted under 35 U.S.C. 154(b) by 485 days.

(21) Appl. No.: 15/995,602

(22) Filed: Jun. 1, 2018

(65) Prior Publication Data
US 2018/0359387 A1  Dec. 13, 2018

(30) Foreign Application Priority Data
Jun. 7, 2017 (JP) .............................. JP2017-112720

(51) Int. Cl.
| | | |
|---|---|---|
| H04N 1/409 | (2006.01) | |
| G06T 5/00 | (2006.01) | |
| G03G 15/01 | (2006.01) | |
| G06T 5/30 | (2006.01) | |
| G03G 15/00 | (2006.01) | |
| G06K 15/02 | (2006.01) | |

(52) U.S. Cl.
CPC ............ *H04N 1/409* (2013.01); *G03G 15/01* (2013.01); *G03G 15/5087* (2013.01); *G06K 15/1873* (2013.01); *G06K 15/1881* (2013.01); *G06T 5/003* (2013.01); *G06T 5/30* (2013.01); *H04N 1/4092* (2013.01)

(58) Field of Classification Search
CPC .. H04N 1/409; H04N 1/4092; G03G 15/5087; G03G 15/01; G06K 15/1881; G06K 15/1873; G06T 5/003; G06T 5/30
See application file for complete search history.

(56) References Cited

U.S. PATENT DOCUMENTS

| | | | |
|---|---|---|---|
| 10,038,820 B2* | 7/2018 | Dobashi | ................. H04N 1/405 |
| 2003/0020681 A1* | 1/2003 | Arita | ........................ G09G 5/02 |
| | | | 345/88 |
| 2003/0231802 A1* | 12/2003 | Sekino | ...................... G06T 9/00 |
| | | | 382/274 |

(Continued)

FOREIGN PATENT DOCUMENTS

| | | |
|---|---|---|
| JP | 2000036912 A | 2/2000 |
| JP | 2009105943 A | 5/2009 |

*Primary Examiner* — John W Lee
(74) *Attorney, Agent, or Firm* — Rossi, Kimms & McDowell LLP

(57) ABSTRACT

The image processing apparatus of the present invention includes: a generation unit configured to generate a sharpness recovery amount for recovering degradation of a spatial frequency response from a target image; and a line width correction unit configured to perform line width correction processing for the target image based on the sharpness recovery amount, and the line width correction unit corrects a line width in accordance with a sign of a pixel whose absolute value of the sharpness recovery amount is large in a case where signs of the sharpness recovery amounts reverse between adjacent pixels of the target image.

13 Claims, 12 Drawing Sheets

(56) References Cited

U.S. PATENT DOCUMENTS

| | | | |
|---|---|---|---|
| 2005/0008251 A1* | 1/2005 | Chiang | G06T 5/003 382/266 |
| 2006/0092271 A1* | 5/2006 | Banno | H04N 19/593 348/14.13 |
| 2007/0080965 A1* | 4/2007 | Kondo | G06K 9/4609 345/441 |
| 2008/0123150 A1* | 5/2008 | Ono | H04N 1/2307 358/3.27 |
| 2008/0130061 A1* | 6/2008 | Nakase | H04N 1/00031 358/406 |
| 2011/0128422 A1* | 6/2011 | Nagata | H04N 5/23229 348/241 |
| 2012/0033098 A1* | 2/2012 | Matsuyama | H04N 5/3532 348/222.1 |

* cited by examiner

| 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|----|----|----|----|----|----|----|----|----|
| 0 | 0 | 0 | 0 | 0 | 0 | -1 | 4 | -4 | 2 | 3 | -2 | 0 | 0 | 0 | 0 | 0 | 0 |

FIG.9B

| 0 | 0 | 0 | 0 | 0 | 0 | 0 | 7 | 0 | 7 | 7 | 0 | 0 | 0 | 0 | 0 | 0 | 0 |
|---|---|---|---|---|---|---|---|---|---|---|---|---|---|---|---|---|---|

CORRECTION AMOUNT  +2    -1    1

FIG.9C

| 1 | 1 | 0 | 1 | 1 | 0 | 1 | 1 | 1 | 1 | 1 | 0 | 1 | 1 | 1 | 0 | 1 | 1 |
|---|---|---|---|---|---|---|---|---|---|---|---|---|---|---|---|---|---|

CORRECTION VALUE  0    0    1

IMAGE PROCESSING APPARATUS, IMAGE FORMING APPARATUS, IMAGE PROCESSING METHOD, AND STORAGE MEDIUM

BACKGROUND OF THE INVENTION

Field of the Invention

The present invention relates to an image processing apparatus for improving sharpness of an image, an image forming apparatus, an image processing method, and a storage medium.

Description of the Related Art

Conventionally, an electrophotographic image forming apparatus is known, such as a laser beam printer and an LED printer, which forms an electrostatic latent image by irradiating a photosensitive body with light beams based on image data and develops the electrostatic latent image by attaching a developer thereto.

In the image forming apparatus such as this, in the light beam irradiation process or in the electrostatic latent image forming process, the image is dulled, and therefore, the contrast of a latent image potential formed on the photosensitive body is reduced. Further, the relationship between the latent image potential on the photosensitive body and the amount of toner to be attached as a developer in the developing process is nonlinear and in addition, the more the contrast of the latent image potential is reduced, the more easily the image is affected. Because of this, fine image data whose image width is narrow and whose contrast of the latent image potential is easily reduced has such a problem that thinning and crushing of a line occur in the image forming process, and therefore, sharpness of an output image is reduced.

Consequently, aiming at suppression of thinning and crushing of a line, a line width correction technique to control the line width of input image data has been disclosed (for example, Japanese Patent Laid-Open No. 2000-36912, Japanese Patent Laid-Open No. 2009-105943). In the technique disclosed in Japanese Patent Laid-Open No. 2000-36912 or Japanese Patent Laid-Open No. 2009-105943, sharpness (thin line reproducibility) of an output image is improved by detecting the line width on image data by referring to image data around the edge portion of a thin line and converting the tone level value of the edge portion by a correction amount in accordance with the detected line width.

However, the technique disclosed in Japanese Patent Laid-Open No. 2000-36912 or Japanese Patent Laid-Open No. 2009-105943 requires processing to detect the line width in image data and there is such a problem that the processing load thereof is heavy. Further, for example, in the case where those techniques are applied to an input image including a complex-shaped character, line drawing, or the like, there is a case where a processing-target edge portion or a line width for determining a correction amount is extracted erroneously, and therefore, there is also such a problem that the line width is not controlled appropriately and improvement of sharpness is not sufficient.

Consequently, an object of the present invention is to appropriately improve sharpness also for an input image including a complex shape with a configuration with less processing load compared to a conventional method of detecting a line width in image data.

SUMMARY OF THE INVENTION

In order to fulfill the above-described object, the image processing apparatus of the present invention includes: a generation unit configured to generate a sharpness recovery amount for recovering degradation of a spatial frequency response from a target image; and a line width correction unit configured to perform line width correction processing for the target image based on the sharpness recovery amount, and the line width correction unit corrects a line width in accordance with a sign of a pixel whose absolute value of the sharpness recovery amount is large in a case where signs of the sharpness recovery amounts reverse between adjacent pixels of the target image.

Further features of the present invention will become apparent from the following description of exemplary embodiments with reference to the attached drawings.

BRIEF DESCRIPTION OF THE DRAWINGS

FIG. 3A is a diagram showing an example of a threshold value matrix;

FIG. 3B is a diagram showing an example of an exposure position mask;

FIG. 9A to FIG. 9C are diagrams showing examples of line width correction processing;

DESCRIPTION OF THE EMBODIMENTS

In the following, embodiments of the present invention are explained with reference to the drawings. The following embodiments are not intended to limit the present invention and all combinations of features explained in the present embodiments are not necessarily indispensable for the solution of the present invention.

First Embodiment (Configuration of Image Forming System)

Figure 1:
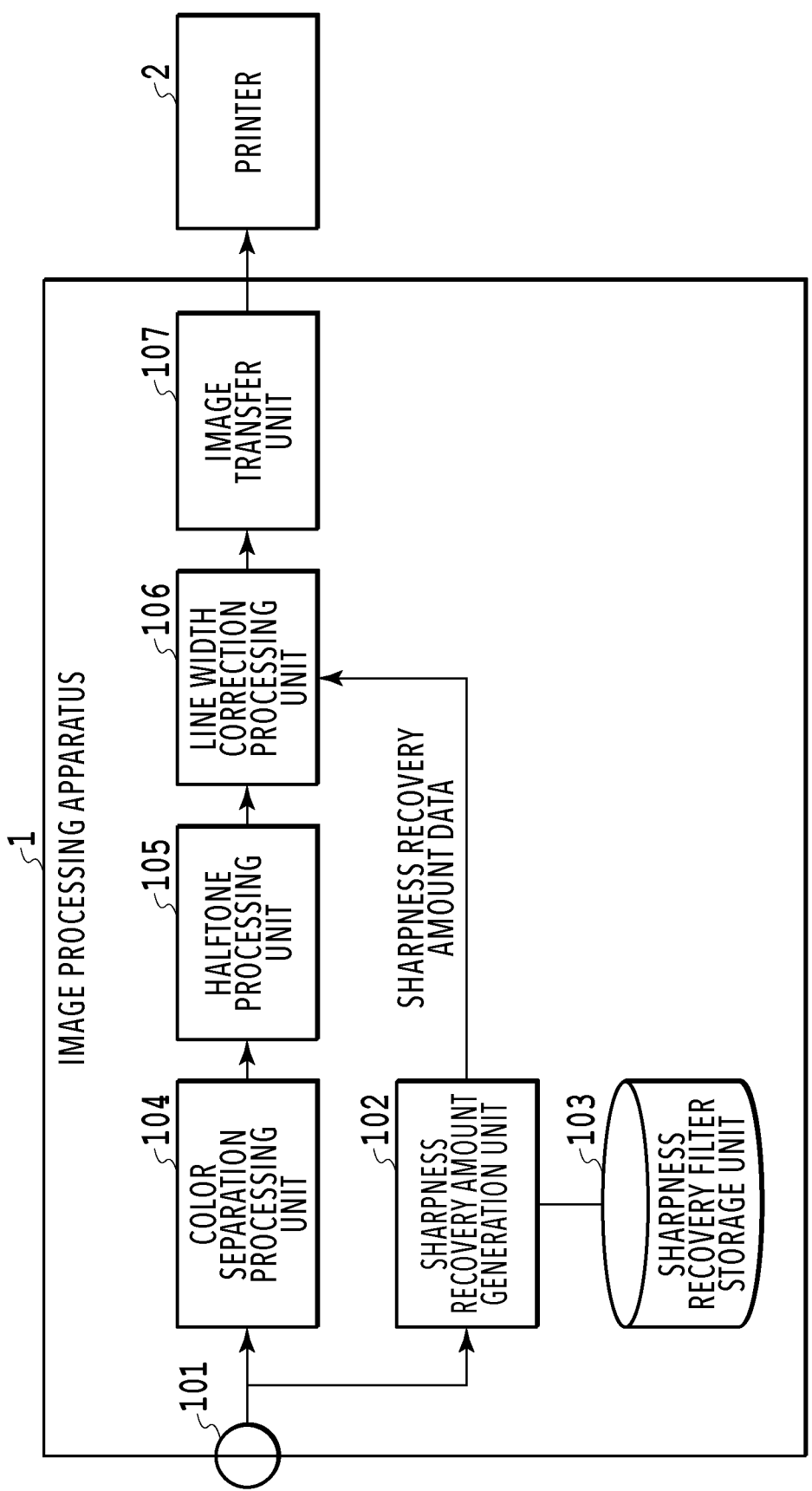
FIG. 1 is a block diagram showing a configuration of an image processing apparatus according to a first embodiment of the present invention.

FIG. 1 is a block diagram showing a configuration of an image processing apparatus according to a first embodiment of the present invention. An image processing apparatus 1 configures an image forming system by connecting to a printer 2, which is an image output unit, by a printer interface or a circuit. The image processing apparatus 1 is implemented by, for example, a printer driver and the like installed in a general personal computer. Further, in that case, each unit of the image processing apparatus 1 to be explained in the following is implemented by the computer executing a predetermined program. Furthermore, as another configuration, for example, one in which the printer 2 includes the image processing apparatus 1 may be made.

The image processing apparatus 1 acquires printing-target image data from an image input terminal 101. Image data is RGB image data made up of 8-bit R (red), G (green), and B (blue). A sharpness recovery amount generation unit 102 generates sharpness recovery amount data for the RGB image data from the input RGB image data. The image processing apparatus 1 generates sharpness recovery amount data by acquiring filter coefficients of a sharpness recovery filter stored in a sharpness recovery filter storage unit 103 by the sharpness recovery amount generation unit 102 and performing a convolution operation for the luminance value of an input image. That is, the image processing apparatus 1 generates sharpness recovery amount data by filter processing.

The creation method of this sharpness recovery filter will be described later. Further, in the present embodiment, as the sharpness recovery filter, a filter having a size of 11×11 is used. Furthermore, the filter processing here may be applied to each piece of RGB image data or RGB image data is converted into a luminance signal and then the filter processing may be applied to the converted luminance signal. As described above, in the present embodiment, RGB image data is converted into a luminance signal and from the converted luminance signal, one sharpness recovery amount is generated. The reason is to reduce the calculation load of the filter processing in the process to generate a sharpness recovery amount relating to a luminance component that is apt to be visually recognized as degradation of image quality and to generate sharpness recovery amount data.

In addition, in the present embodiment, it is assumed that the results of the filter processing are compressed to 15 tone levels (that is, stored within four bits) including pixel values from −7 to +7 and then output. The reason is to reduce the number of bits of a signal. Further, in the present embodiment, the sharpness recovery amount is obtained from RGB image data input from the image input terminal 101, but it is also possible to obtain the sharpness recovery amount from image data compatible with color materials that the printer 2 has and output from a color separation processing unit 104, to be described later.

The color separation processing unit 104 converts input RGB image data into image data compatible with color materials that the printer 2 has. Here, RGB image data is converted into image data of C (cyan), M (magenta), Y (yellow), and K (black). It is assumed that CMYK image data is image data of 256 tone levels (that is, eight bits) having one of pixel values 0 to 255 in each pixel.

A halftone processing unit 105 performs halftone processing for each color separated image. Specifically, the halftone processing unit 105 generates halftone image data by performing halftone processing for image data after color separation delivered from the color separation processing unit 104.

To the halftone processing, the publicly known halftone processing technique, such as the dither processing using a threshold value matrix and the error diffusion method, is applied. Generally, halftone processing in accordance with the image processing apparatus 1 is performed and in the present embodiment, it is assumed that halftone processing by so-called multivalued dither is performed. Specifically, by dither processing to convert image data into image data having a periodic screen structure, image data of 256 tone levels is converted into image data of seven tone levels (that is, stored within three bits) including pixel values from zero to six.

Further, in this case, each pixel value in a halftone image after halftone processing corresponds to the intensity of an exposure control signal. The printer 2 in the present embodiment can output an exposure control signal at eight levels and for example, the pixel whose pixel value is "0" in a halftone image means that the intensity of the exposure control signal is "0", that is, the pixel is a non-exposure pixel for which exposure is not performed.

In addition, the halftone processing unit 105 generates exposure position information specifying a direction in which the exposure position is justified at the time of exposure scan in the printer 2. Here, it is known that the phase is controlled by a pulse width modulated write signal in order to improve image quality in an electrophotographic image forming apparatus. Specifically, by justifying the exposure scan for each pixel toward the adjacent pixel so as to link with the turned-on pixel of the adjacent pixel (pixels are linked by switching right-justified, left-justified, and so on), the electrostatic latent image on the photosensitive body is stabilized.

The exposure position information indicates the justification direction of the exposure scan for each pixel and it is assumed that the exposure position information is generated as data indicating, for example, right-justified and left-justified by 0 and 1, respectively (that is, stored within one bit). For generation of the exposure position information, it is possible to use a publicly know technique, such as generating the exposure position information based on a mask indicating the exposure position (hereinafter, exposure position mask) created in advance in accordance with a screen structure of dither.

After generating the halftone image data (three bits) after halftone processing for each color of CMYK and the exposure position information (one bit), the halftone processing unit 105 transmits them to a line width correction processing unit 106. The line width correction processing unit 106 performs line width correction processing by correcting the pixel value (that is the intensity of the exposure control signal) for the image data after halftone processing delivered from the halftone processing unit 105. At the time of line width correction processing, the line width correction processing unit 106 determines the correction position and the correction amount based on the sharpness recovery amount data delivered from the sharpness recovery amount generation unit 102.

The line width correction processing unit 106 further performs correction processing for the exposure position information delivered from the halftone processing unit 105. At the time of correction processing of the exposure position information, the line width correction processing unit 106 determines the justification direction of the exposure scan based on the sharpness recovery amount data delivered from the sharpness recovery amount generation unit 102. An image transfer unit 107 sends out the image data and the exposure position information after the line width correction processing to the printer 2 at predetermined timing.

(Processing Flow of Image Forming System)

Figure 2:
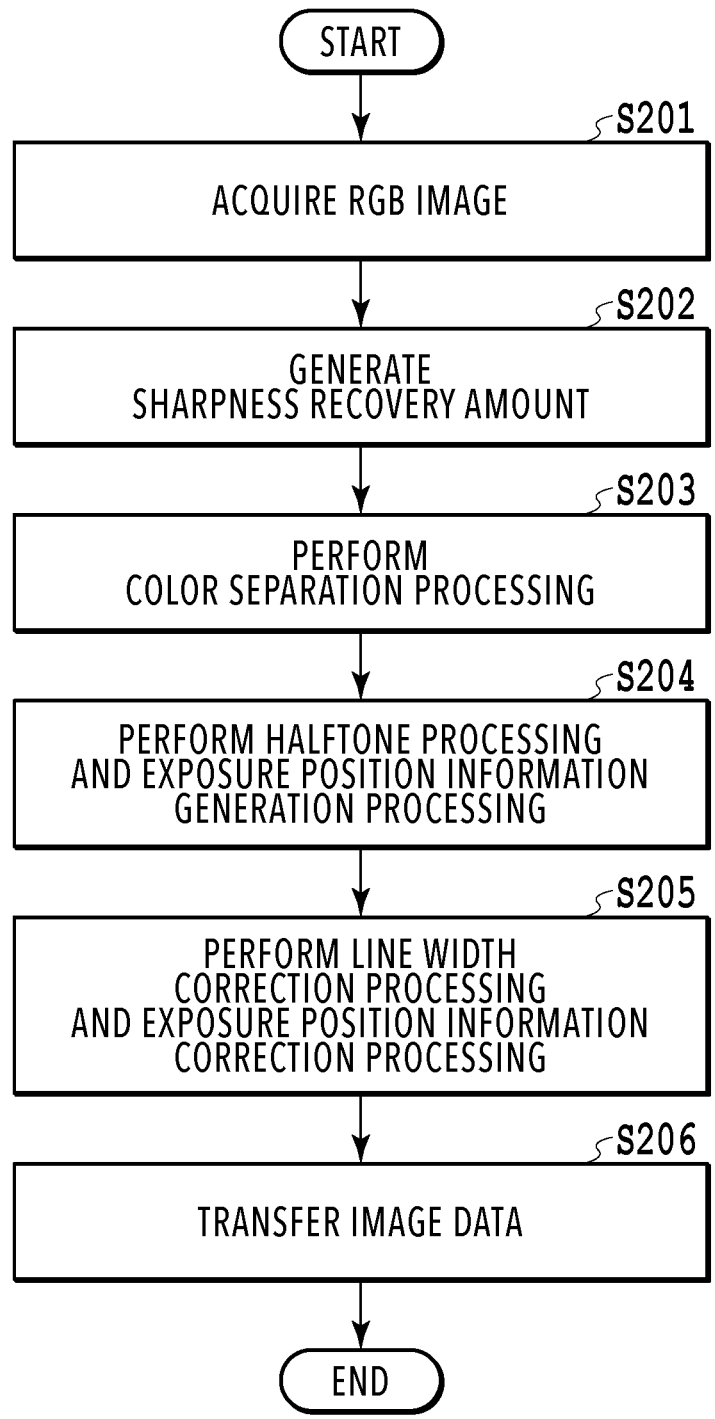
FIG. 2 is a diagram showing a procedure of processing in the image processing apparatus according to the first embodiment of the present invention.

Next, a procedure of processing in the image processing apparatus according to the embodiment of the present invention is explained by using FIG. 2. The image processing apparatus 1 acquires an RGB image input from the image input terminal 101 (S201). The image processing apparatus 1 acquires the filter coefficients of the sharpness recovery filter stored in the sharpness recovery filter storage unit 103 by the sharpness recovery amount generation unit 102, performs the convolution operation for the luminance value of the input image, and generates sharpness recovery amount data (S202).

In the present embodiment, the sharpness recovery amount data is a recovery amount for compensating for degradation of the spatial frequency response in an image and the like formed on a printing medium and has a concept different from that of the edge amount obtained by so-called edge detection. Because of this, unlike the publicly known Laplacian filter and the like, it is possible to acquire recovery amount information on an arbitrary frequency, not only an edge portion.

The image processing apparatus 1 performs processing to separate RGB image data into CMYK image data by the color separation processing unit 104 (S203). The image data corresponding to each of CMYK is 8-bit image data indicating 256 tone levels. Here, to explain using image data corresponding to K as an example, the larger the pixel value, the darker black the pixel is shown in and the pixel whose pixel value is "0" (white pixel) is shown as a non-exposure pixel at the time of image formation.

Next, the image processing apparatus 1 generates exposure position information as well as performing halftone processing using the dither method for each piece of image data corresponding to each color of CMYK by the halftone processing unit 105 and generating a halftone image (S204). This exposure position information is information that is set for each pixel based on the exposure position mask created in advance and indicates which direction to be justified to link with the turned-on pixel of the adjacent pixel in the screen structure.

Figures 3A, 3B:
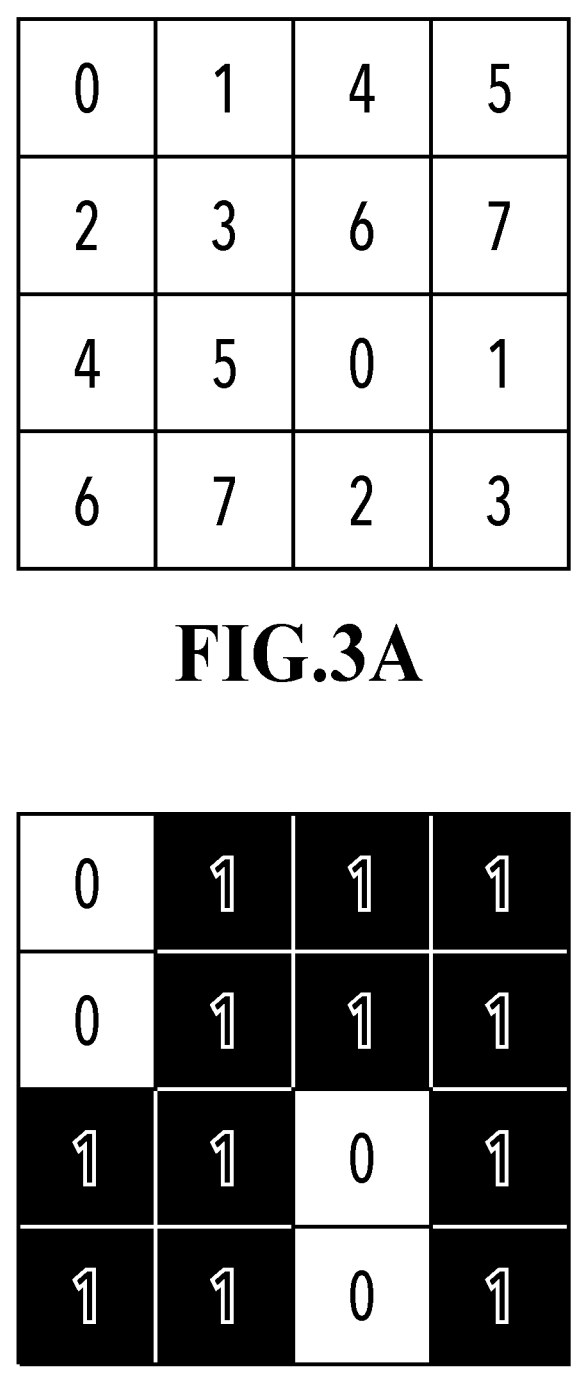

FIG. 3A is a diagram showing an example of a threshold value matrix. Further, FIG. 3B is a diagram showing an example of an exposure position mask corresponding to the threshold value matrix. For convenience of explanation, it is assumed that the threshold value matrix here is a threshold value matrix having values from zero to seven. One cell in the exposure position mask corresponds to one pixel and in each cell, information indicating the justification direction (0=right-justified, 1=left-justified) is input. Then, by copying the exposure position mask corresponding to the threshold value matrix, exposure position information on each pixel is generated.

The image processing apparatus 1 corrects, by the line width correction processing unit 106, the exposure position information as well as correcting the line width of the image data after halftone processing delivered from the halftone processing unit 105 based on the sharpness recovery amount data generated by the sharpness recovery amount generation unit 102 (S205). Here, in the sharpness recovery amount data, there are characteristics that thinning and crushing of a line occur and sharpness of an output image is easily reduced in a pixel whose absolute value of sharpness recovery amount (degree of sharpness degradation) is larger of pixels whose positive and negative signs reverse (zero cross). Because of this, in the present embodiment, by using such characteristics of the sharpness recovery amount, sharpness is improved. The image processing apparatus 1 transfers the image data and the exposure position information after line width correction processing to the printer 2 in an arbitrary size, such as the size corresponding to the bandwidth of the whole image or the size corresponding to that for each unit printing area (S206).

(Creation Method of Sharpness Recovery Filter)

Next, a creation method of a sharpness recovery filter is explained. In the present embodiment, from degradation of a spatial frequency response of an image formed on a printing medium, the coefficients of a sharpness recovery filter are calculated.

Figure 4:
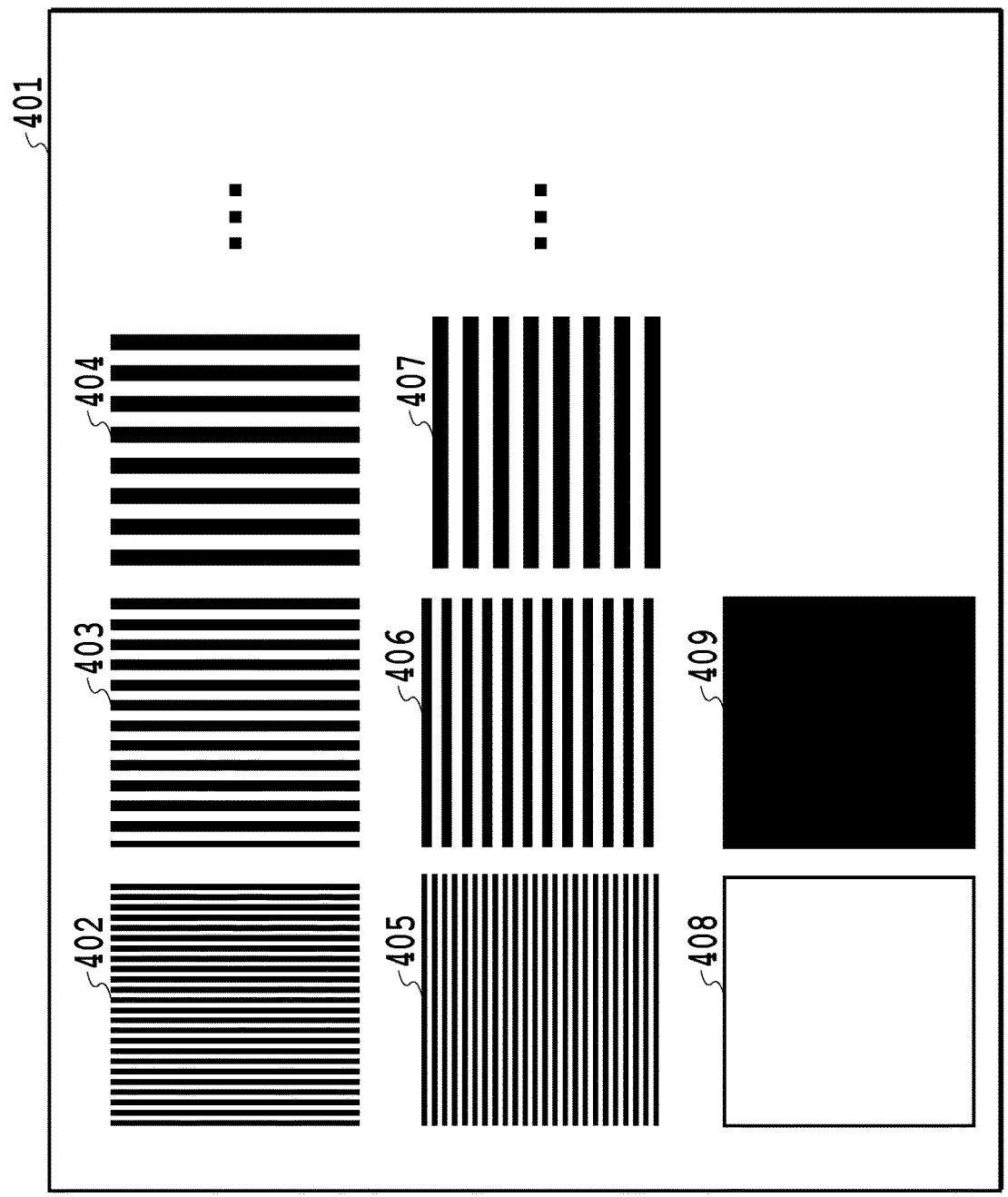
FIG. 4 is a diagram showing an example of a measurement chart.

First, by using the printer 2 for which a filter is to be designed, a sharpness measurement chart is output. At the time of output of a measurement chart, the sharpness recovery processing is not performed. FIG. 4 is an example of a measurement chart and a measurement chart 401 is shown as an image chart including a plurality of sinusoidal wave patterns different in frequency and direction and uniform patterns (for example, solid white and solid black).

In the measurement chart 401, patterns 402, 403, and 404 are sinusoidal wave patterns different in frequency in the horizontal direction and patterns 405, 406, and 407 are sinusoidal wave patterns different in frequency in the vertical direction. Further, a pattern 408 is a solid white uniform pattern and a pattern 409 is a solid black uniform pattern.

Here, as a frequency response value P (u), for example, an optical transfer function (OTF) that is calculated by using an expression below can be used.

$$P(u)=C(u)/C' \qquad \text{expression (1)}$$

In the above-described expression, u is the frequency of a sinusoidal wave pattern and C (u) and C' are expressed by expressions (2) and (3) below.

$$C(u)=\{\text{Max}(u)-\text{Min}(u)\}/\{\text{Max}(u)+\text{Min}(u)\} \qquad \text{expression (2)}$$

$$C'=(\text{White}-\text{Black})/(\text{White}+\text{Black}) \qquad \text{expression (3)}$$

In the above-described expressions, Max (u) is the maximum lightness of the sinusoidal wave pattern than changes at the frequency u, Min (u) is the minimum lightness of the sinusoidal wave pattern that changes at the frequency u, and White and Black are lightness of the solid white uniform pattern and lightness of the solid black uniform pattern, respectively.

The calculation method of the optical transfer function is not limited to the above-described expressions and for example, an expression below may be used.

$$P(u)=\{\text{Max}(u)-\text{Min}(u)\}/(\text{White}-\text{Black}) \qquad \text{expression (4)}$$

Further, in expression (4) described above, the frequency response value P (u) is calculated by using Max (u), Min (u), White, and Black as lightness, but for example, the frequency response value P (u) may be calculated by using the luminance, density, device RGB values of a measurement device, and so on. Furthermore, it may also be possible to acquire the frequency characteristics P (u) by using rectangular wave patterns in place of sinusoidal wave patterns as a measurement chart. In such a case, the value of a contrast transfer function (CTF) calculated by applying expression (1) to the rectangular wave pattern is used as the frequency characteristics P (u).

Alternatively, an OTF value obtained by converting a CTF value by using the publicly known Coltman's correction formula may be used for the frequency characteristics P (u).

Figure 5:
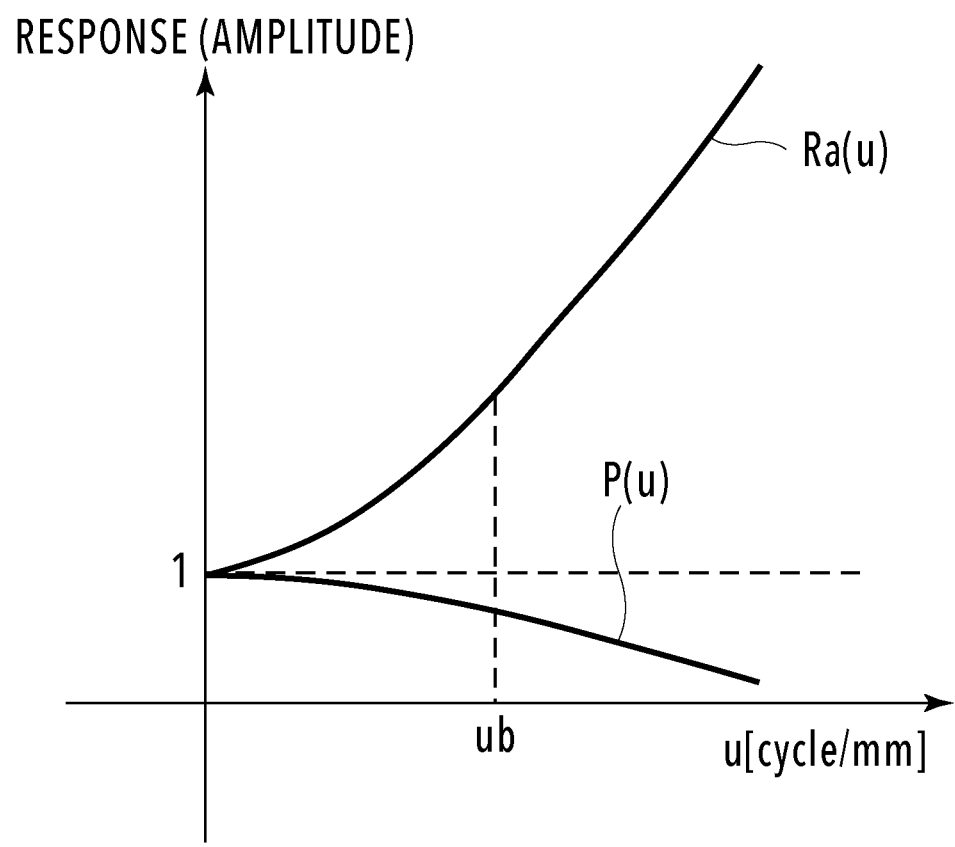
FIG. 5 is a diagram showing an example of spatial frequency characteristics and frequency characteristics of a sharpness recovery filter.

Next, based on the frequency characteristics P (u), frequency characteristics Ra (u)=1/P (u) of the sharpness recovery filter are calculated. FIG. 5 shows an example of the frequency characteristics P (u) and the frequency characteristics Ra (u) of the sharpness recovery filter. In FIG. 5, the vertical axis represents the response value (amplitude) and the horizontal axis represents the frequency. The frequency characteristic Ra (u) of the sharpness recovery filter are that the response becomes strong in the high-frequency region where the value of the frequency u is large. Lastly, by performing inverse Fourier transform for the frequency characteristics Ra (u), the coefficients of the sharpness recovery filter are calculated.

(Details of Line Width Correction Processing)

Figure 6:
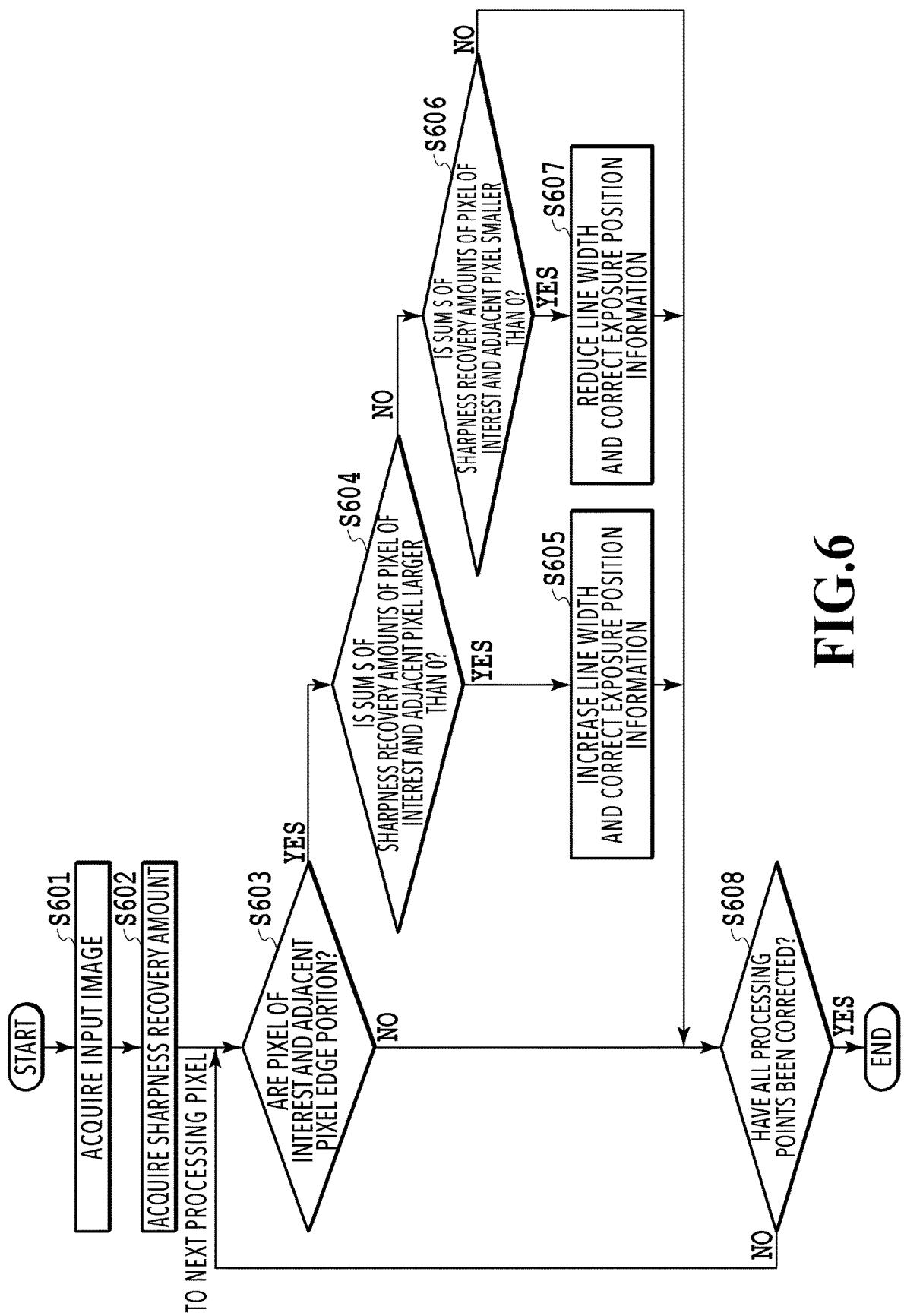
FIG. 6 is a diagram showing a procedure of line width correction processing in the image processing apparatus according to the first embodiment of the present invention.

In the following, the line width correction processing of the image processing apparatus according to the embodiment of the present invention is explained in detail by using FIG. 6. First, the line width correction processing unit 106 acquires an input image (target image) (S601). The input image here refers to a halftone image and exposure position information delivered from the halftone processing unit 105.

Figure 7:
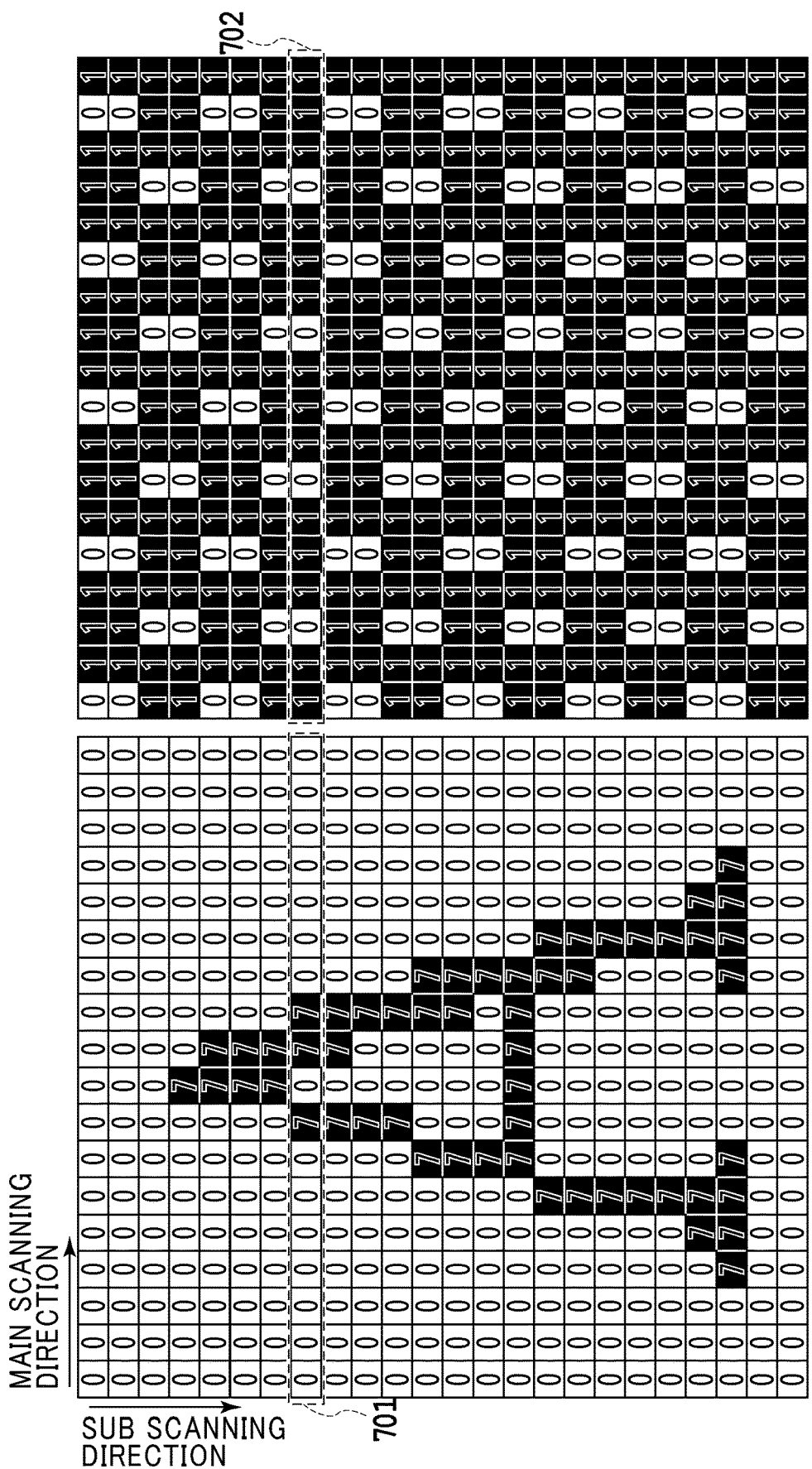
FIG. 7A is a diagram showing an example of a halftone image after halftone processing.
FIG. 7B is a diagram showing an example of exposure position information after halftone processing.

A halftone image is shown in FIG. 7A as an example and exposure position information is shown in FIG. 7B as an example. FIG. 7A is an example of halftone image data and is an image of a solid character "A". Further, FIG. 7B is an example of exposure position information corresponding to FIG. 7A.

Figure 8:
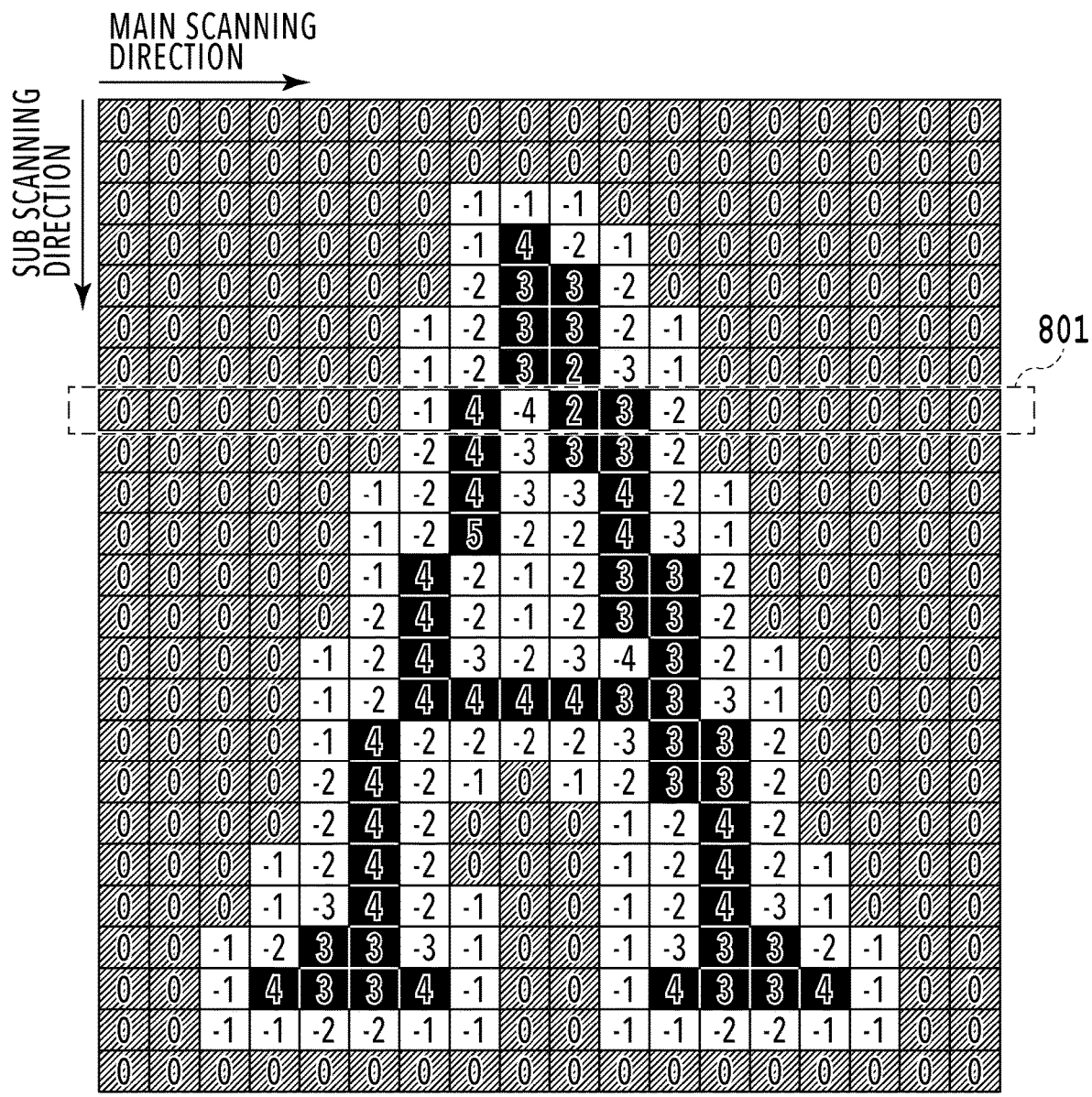
FIG. 8 is a diagram showing an example of sharpness recovery amount data.

Next, the line width correction processing unit 106 acquires a sharpness recovery amount as data (S602). The sharpness recovery amount is a value corresponding to each pixel of the sharpness recovery amount data delivered from the sharpness recovery amount generation unit 102. FIG. 8 is an example of the sharpness recovery amount data corresponding to FIG. 7A.

The sharpness recovery amount data indicates a degree of recovery of sharpness degradation (that is, thinning or crushing of a line in the image forming process). As shown in FIG. 8, the sharpness recovery amount is a large positive value (the density of the edge is reduced and the line is apt to thin) in the vicinity of the edge inside the character image and the sharpness recovery amount is a small negative value (the density of the edge is increased and the line is apt to crush) in the vicinity of the edge outside the character image.

The line width correction processing unit 106 determines whether the processing point is an edge portion (S603). The sharpness recovery amount data has the characteristics that the pixel at which the positive and negative signs of the sharpness recovery amounts reverse (zero cross) corresponds to an edge, and therefore, it is possible to specify the position of an edge also in a complex-shaped image by referring to the sharpness recovery amount.

Specifically, by referring to the sharpness recovery amount of the pixel of interest and the sharpness recovery amount of a pixel adjacent to the pixel of interest in the main scanning direction (between adjacent pixels), whether the positive and negative signs reverse between adjacent pixels is determined. Further, by referring to the halftone image data at the same position, whether at least one exposure pixel (pixel whose pixel value is not 0) exists is determined. In the present embodiment, in the case where the positive and negative signs of the sharpness recovery amounts reverse between adjacent pixels and at least one pixel of the halftone image is an exposure pixel, it is determined that the processing point is an edge portion.

It is also possible to determine whether or not the processing point is an edge portion by the conventional method. Consequently, for example, it is also possible to determine an edge portion by applying the edge detection filter processing that uses a primary differential filter or a secondary differential filter. Further, the sharpness recovery amount data is acquired from the luminance value of the input image, and therefore, an edge does not necessarily exist in all the halftone images of CMYK. For example, at an edge of an image (red and the like) in which the cyan component is not included, no edge exists in a cyan halftone image. Because of this, whether an edge (image) is included in a halftone image in a processing-target color is also determined.

In the case where the processing pixel is an edge portion (S603 Yes), the line width correction processing unit 106 advances the processing to step S604 and determines the line width correction direction at the edge portion. Because there are characteristics that thinning and crushing of a line are apt to occur concerning a pixel whose absolute value of the sharpness recovery amount (degree of sharpness degradation) is large in the image forming process, the line width correction direction is determined by making use of such characteristics. Further, in the case where the processing pixel is not an edge portion (S603 No), the processing is caused to advance to step S608.

At step S604, the line width correction processing unit 106 determines whether or not a sum value S of the sharpness recovery amounts between adjacent pixels is larger than 0 (that is, whether or not the absolute value of the positive pixel is larger than the absolute value of the negative pixel). Then, in the case where the sum value S of the sharpness recovery amounts between adjacent pixels is larger than 0 (S604 Yes), the processing is caused to advance to step S605 and in the other cases (S604 No), the processing is caused to advance to step S606.

At step S606, the line width correction processing unit 106 determines whether or not the sum value S of the sharpness recovery amounts between adjacent pixels is smaller than 0 (that is, whether or not the absolute value of the positive pixel is smaller than the absolute value of the negative pixel). Then, in the case where the sum value S of the sharpness recovery amounts between adjacent pixels is smaller than 0 (S606 Yes), the processing is caused to advance to step S607 and in the other cases (S607 No), the processing is caused to advance to step S608.

In the case where the sum value S of the sharpness recovery amounts between adjacent pixels is larger than 0 (S604 Yes), the line width correction processing unit 106 performs the line width correction processing and the exposure position information correction processing (S605). In this case, because the absolute value of the positive pixel of the sharpness recovery amount is larger than the absolute value of the negative pixel, the density of the positive pixel is reduced and the line is apt to thin, and therefore, processing to increase the line width (that is, to reduce the solid white) is performed. Specifically, the line width is increased by adding a correction amount (positive value) calculated based on the sum value S of the sharpness recovery amounts to the halftone image data located at the negative pixel. Here, a value ½ of the sum value S of the sharpness recovery amounts (that is, the average value of the sharpness recovery amounts) is calculated as a correction amount. Further, by correcting the exposure position information located at the negative pixel so as to link with the positive pixel, the electrostatic latent image on the photosensitive body of the pixel to which the correction value is added is stabilized.

Further, also in the case where the sum value S of the sharpness recovery mounts between adjacent pixels is smaller than 0 (S606 Yes), the line width correction processing and the exposure position information correction processing are performed (S607). In this case, because the absolute value of the positive pixel of the sharpness recovery amount is smaller than the absolute value of the negative pixel, the density of the negative pixel is increased and the line is apt to crush, and therefore, processing to reduce the line width (that is, to increase the solid white) is performed. Specifically, the line width is reduced by adding a correction amount (negative value) calculated based on the sum value S of the sharpness recovery amounts to the halftone image data located at the positive pixel. Here, as at step S605, a value ½ of the sum value S of the sharpness recovery amounts (that is, the average value of the sharpness recovery amounts) is calculated as a correction amount. Further, by correcting the exposure position information located at the positive pixel so as to reject the negative pixel, (that is, to link with a non-exposure portion), the electrostatic latent image on the photosensitive body of the pixel to which the correction value is added is stabilized.

As a supplement, in the present embodiment, the correction amount is calculated based on the sum value S of the sharpness recovery amounts. Due to this, it is possible to make the degree of correction larger for the pixel whose absolute value of the sharpness recovery amount (that is, the degree of sharpness degradation) is larger (that is, the pixel more likely to thin or crush a line).

At step S608, the line width correction processing unit 106 determines whether or not the line width correction processing has been completed at all the processing points of the input image acquired at step S601 (S608). Then, in the case where the line width correction processing has been completed (S608 Yes), the processing shown in FIG. 6 is terminated and in the case where the line width correction processing has not been completed (S608 No), the processing is caused to return to step S603 and the subsequent processing is performed.

Next, by using FIG. 9A to FIG. 9C, the line width correction processing is explained as an example. FIG. 9A is the sharpness recovery amount indicated by a dotted line 801 in FIG. 8, FIG. 9B is the halftone image data indicated by a dotted line 701 in FIG. 7A, and FIG. 9C is the exposure position information indicated by a dotted line 702 in FIG. 7B, each showing data of the same line in the sub scanning direction. In FIG. 9A to FIG. 9C, for convenience of explanation, pixel number (1 to 18) is attached to each pixel in the main scanning direction.

The line width correction processing unit 106 determines a pixel of interest, which is a processing point, and an adjacent pixel. After processing is started, in the case where the pixel with pixel number 1 is determined to be a pixel of interest, the pixel with pixel number 2, which is adjacent in the main scanning direction, is determined to be an adjacent pixel. At the processing points where the pixel of interest is the pixel with one of pixel numbers 1 to 6, the positive and negative signs of the sharpness recovery amounts do not reverse and further, no exposure pixel exists in the halftone image, and therefore, the processing point is not determined to be an edge portion at step S603. Because of this, the processing is caused to advance to step S608 and the processing is performed for the next processing point.

At the processing point where the pixel of interest is the pixel with pixel number 7, the positive and negative signs of the sharpness recovery amounts (pixel of interest −1, adjacent pixel 4) reverse and at least one pixel of the halftone images (pixel of interest 0, adjacent pixel 7) is an exposure pixel, and therefore, the processing point is determined to be an edge portion. Next, at step S604, the line width correction processing unit 106 determines whether the sum value S (−1+4=3) of the sharpness recovery amounts of the pixel of interest and the adjacent pixel is larger than 0. Here, the sum value S of the sharpness recovery amounts of the pixel of interest and the adjacent pixel is larger than 0, and therefore, the processing is caused to advance to step S605.

The line width correction processing unit 106 calculates a value ½ of the sum value 3 (rounded to "2") of the sharpness recovery amounts as a correction amount and adds to the halftone image located at the negative pixel of the sharpness recovery amount. Further, the exposure position information located at the negative pixel of the sharpness recovery amount is corrected to right-justified "0" so as to link with the positive pixel (here, the exposure position information is originally right-justified, and therefore, there is no change). After this, the processing is caused to advance to step S608 and the processing is performed for the next processing point.

At the processing point where the pixel of interest is the pixel with pixel number 8, the positive and negative signs of the sharpness recovery amounts (pixel of interest 4, adjacent pixel −4) reverse and at least one of the halftone images (pixel of interest 7, adjacent pixel 0) is an exposure pixel, and therefore, the processing point is determined to be an edge portion. Next, at step S604, the line width correction processing unit 106 determines whether or not the sum value S (4+(−4)=0) of the sharpness recovery amounts of the pixel of interest and the adjacent pixel is larger than 0 (S>0). Here, the sum value S of the sharpness recovery amounts of the pixel of interest and the adjacent pixel is not larger than 0, and therefore, the processing is caused to advance to step S606.

At step S606, the line width correction processing unit 106 further determines whether or not the sum value S (4+(−4)=0) of the sharpness recovery amounts of the pixel of interest and the adjacent pixel is smaller than 0 (S<0). Here, the sum value S of the sharpness recovery amounts of the pixel of interest and the adjacent pixel is not smaller than 0, and therefore, the processing is caused to advance to step S608 and the processing is performed for the next processing unit.

At the processing point where the pixel of interest is the pixel with pixel number 9, the positive and negative signs of the sharpness recovery amounts (pixel of interest −4, adjacent pixel 2) reverse and at least one of the halftone images (pixel of interest 0, adjacent pixel 7) is an exposure pixel, and therefore, the processing point is determined to be an edge portion. Next, at step S604, the line width correction processing unit 106 determines whether or not the sum value S (−4+2=−2) of the sharpness recovery amounts of the pixel of interest and the adjacent pixel is larger than 0 (S>0). Here, the sum value S of the sharpness recovery amounts of the pixel of interest and the adjacent pixel is not larger than 0, and therefore, the processing is caused to advance to step S606.

At step S606, the line width correction processing unit 106 further determines whether or not the sum value S (−4+2=−2) of the sharpness recovery amounts of the pixel of interest and the adjacent pixel is smaller than 0 (S<0). Here, the sum value S of the sharpness recovery amounts of the pixel of interest and the adjacent pixel is smaller than 0, and therefore, the processing is caused to advance to step S607.

The line width correction processing unit 106 calculates a value ½ of the sum value −2 (−1) of the sharpness recovery amounts as a correction amount and adds to the halftone image located at the positive pixel of the sharpness recovery amount. Further, the exposure position information located at the negative pixel of the sharpness recovery amount is corrected to right-justified "0" so as to reject the positive pixel. After this, the processing is caused to advance to step S608 and the processing is performed for the next processing point.

At the processing point where the pixel of interest is the pixel with pixel number 10, the positive and negative signs of the sharpness recovery amounts (pixel of interest 2, adjacent pixel 3) do not reverse, and therefore, the processing point is not determined to be an edge portion. Because of this, the processing is caused to advance to step S608 and the processing is performed for the next processing point.

At the processing point where the pixel of interest is the pixel with pixel number 11, the positive and negative signs of the sharpness recovery amounts (pixel of interest 3, adjacent pixel −2) reverse and at least one of the halftone images (pixel of interest 7, adjacent pixel 0) is an exposure pixel, and therefore, the processing point is determined to be an edge portion. Next, at step S604, the line width correction processing unit 106 determines whether or not the sum value S (3+(−2)=1) of the sharpness recovery amounts of the pixel of interest and the adjacent pixel is larger than 0. Here, the sum value S of the sharpness recovery amounts of the pixel of interest and the adjacent pixel is larger than 0, and therefore, the processing is caused to advance to step S605.

The line width correction processing unit 106 calculates a value ½ of the sum value 1 (rounded to "1") of the sharpness recovery amounts as a correction amount and adds to the halftone image located at the negative pixel of the sharpness recovery amount. Further, the exposure position information located at the negative pixel of the sharpness recovery amount is corrected to left-justified "1" so as to link with the positive pixel (here, the exposure position information is originally left-justified, and therefore, there is no change). After this, the processing is caused to advance to step S608 and the processing is performed for the next processing point.

At the processing point where the pixel of interest is the pixel with one of pixel numbers 12 to 18, the positive and negative signs of the sharpness recovery amounts do not reverse and further, no exposure pixel exists in the halftone images, and therefore, the processing point is not determined to be an edge portion at step S603. Because of this, the processing is caused to advance to step S608 and the processing is performed for the next processing point. Then, in the case where the image end is reached, whether or not there is an unprocessed line is checked and in the case where there is an unprocessed line, the same processing is performed by moving to the next line. In the case where there is no unprocessed line, the series of line with correction processing is terminated.

Figure 10A:
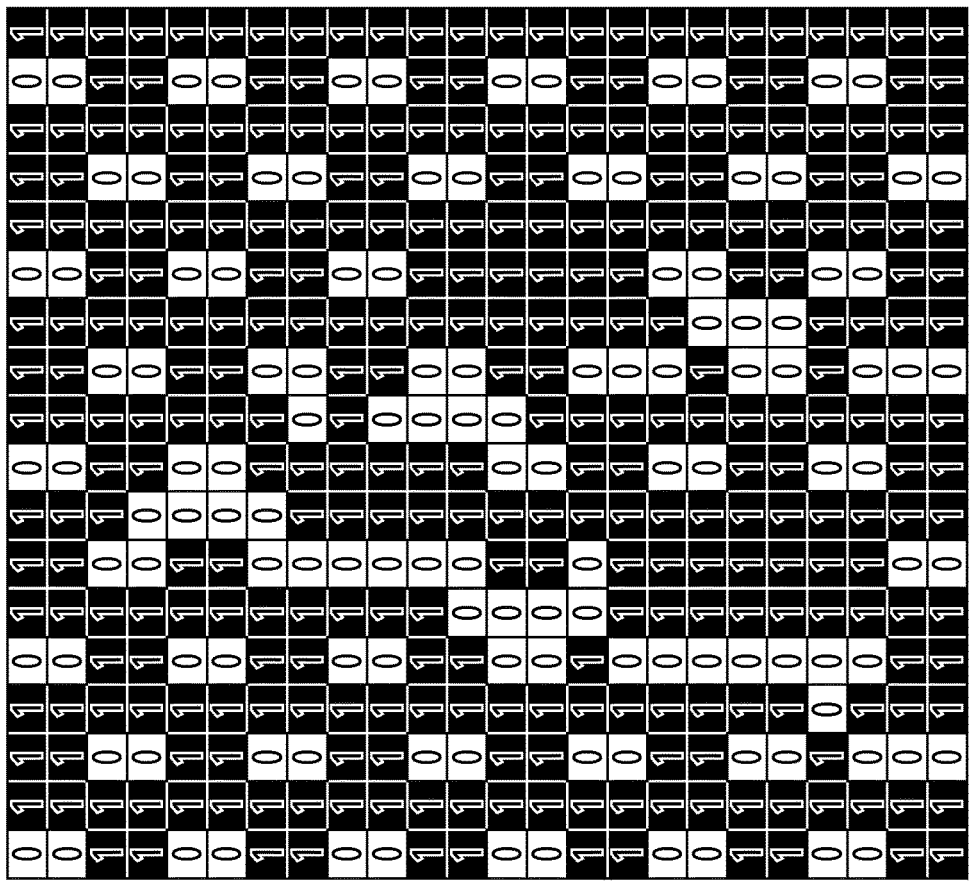
FIG. 10A is a diagram showing an example of a halftone image after line width correction processing.
Figure 10B:
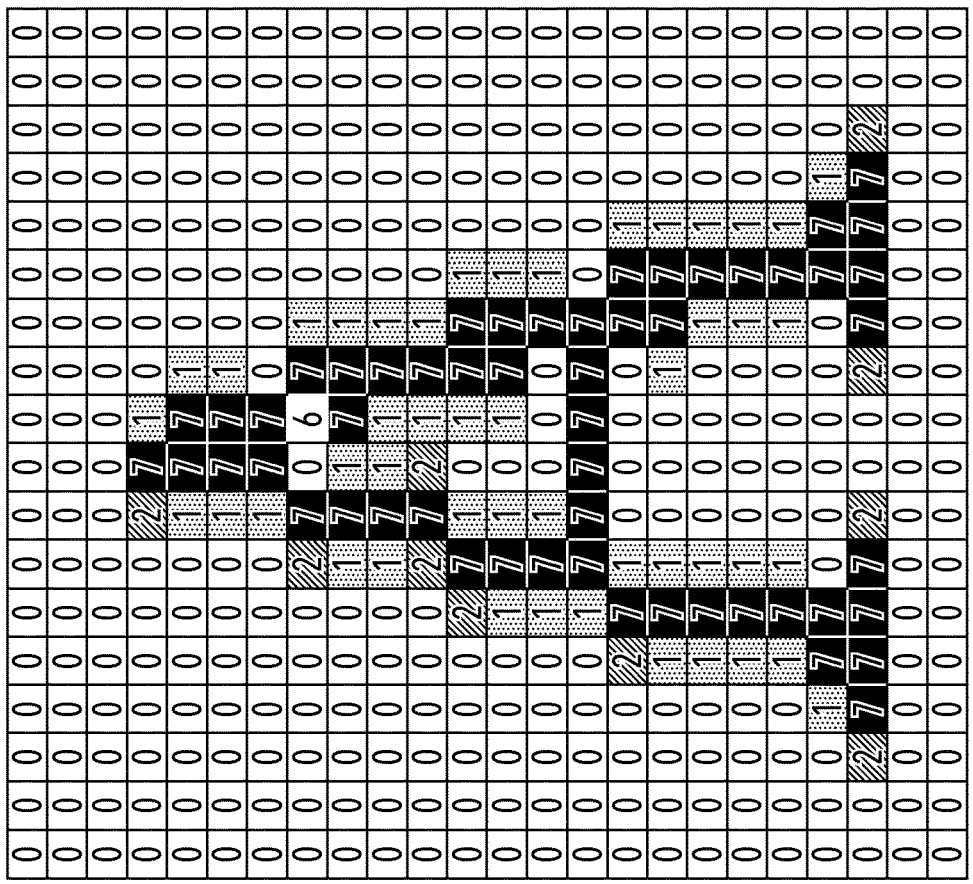
FIG. 10B is a diagram showing an example of exposure position information after line width correction processing.

FIG. 10A is data obtained by performing the line width correction processing for the halftone image data shown in FIG. 7A. Further, FIG. 10B is data obtained by performing the line width correction processing for the exposure position information shown in FIG. 7B. The halftone image data shown in FIG. 10A is corrected based on the sharpness recovery amount in the pixel at the edge portion.

As described above, it is possible to make larger the degree of correction for the pixel whose absolute value of the sharpness recovery amount (degree of sharpness degradation) is larger (that is, the pixel more likely to thin or crush a line), and therefore, it is possible to appropriately suppress thinning and crushing of a line.

In the present embodiment, in order to explain the effect of the present invention more remarkably, the schematic diagram in which the boundary of edge areas is comparatively clear is explained as an example here. Further, by applying the present invention, it is possible to acquire the sharpness recovery amounts as consecutive values for any input image, and therefore, it is possible to appropriately improve sharpness also for an input image including a halftone edge whose boundary of areas is unclear.

Furthermore, in the present embodiment, the example is shown in which the line width correction processing is performed in the main scanning direction, but it is also possible to perform the line width correction processing in the sub scanning direction. However, in such a case, it is not possible to justify the exposure scan in the sub scanning direction, and therefore, only the halftone image is corrected and the correction of the exposure position information is not performed. Further, it is also possible to perform the line width correction processing both in the main scanning direction and in the sub scanning direction.

In addition, in the present embodiment, it is enough to refer to the sharpness recovery amounts of the pixel of interest of the processing point and the adjacent pixel, and therefore, it is not necessary to perform a calculation whose processing load is heavy, such as extraction processing of a processing-target edge portion or a line width for determining a correction amount.

As described above, according to the present embodiment, based on the sharpness recovery amount generated by the sharpness recovery filter, the line width correction direction and the line width correction amount are determined. Due to this, it is possible to appropriately improve sharpness also for an input image including a complex-shaped character, line drawing, or the like with a simple configuration compared to the conventional method of extracting a line width.

Second Embodiment

In the above-described embodiment, the example is explained in which the value generated by using the sharpness recovery filter is used as the sharpness recovery amount as it is, but it may also be possible to add the sharpness recovery amount to the input image and to use the sharpness recovery amount corresponding to that which exceeds the upper limit value of the input image. That is, it may also be possible to perform the sharpness recovery processing by the normal filter processing until the upper limit value of the input image is reached and to improve sharpness by the line width correction processing for that which exceeds the upper limit value. Further, the average value of the sharpness recovery amounts of the processing point is calculated as a correction amount, but the calculation method of a correction amount is not limited to this. For example, the absolute value of the sharpness recovery amount may be used as a correction amount or it may also be possible to find a correction amount by using a lookup table, a function, and so on.

Further, in the above-described embodiment, the example is explained in which the coefficients of the sharpness recovery filter are acquired from the degradation of the spatial frequency response of the image formed on a printing medium, but the coefficients of the sharpness recovery filter predicted from the degradation characteristics of the image forming process may be used. Consequently, it is also possible to predict the degradation of the spatial frequency response of the image formed on a printing medium from, for example, the light beam diameter in the light beam irradiating process or the design value of dullness of the image in the electrostatic latent image forming process. Further, in the present embodiment, the example is explained in which the correction amount is added to the halftone image, but it may also be possible to make a configuration in which the correction amount is added to the image before the halftone processing.

Third Embodiment

In the first embodiment described above, the example is explained in which the value generated by using the sharpness recovery filter is used as the sharpness recovery amount as it is. However, there is a case where it is better to correct the line width also in the case where the absolute values of the positive and negative sharpness recovery amounts at the edge portion are the same. For example, depending on the printer engine and the image design, there is a case where a black line (line on which a color material is placed) is printed thick and a solid-white line is printed thin even though the line width is the same on the digital image. Because of this, it is appropriate to give priority to reproduction of a solid-white line and to reduce the density of the edge portion of a black line.

Consequently, in a third embodiment, a configuration is explained in which the sharpness recovery amount is used after being modified so as to give priority to reproduction of a solid-white line. In the present embodiment, detailed explanation of each of the elements in common to those of the above-described first embodiment with respect to working and function is omitted appropriately by attaching the same symbols thereto.

Figure 11:
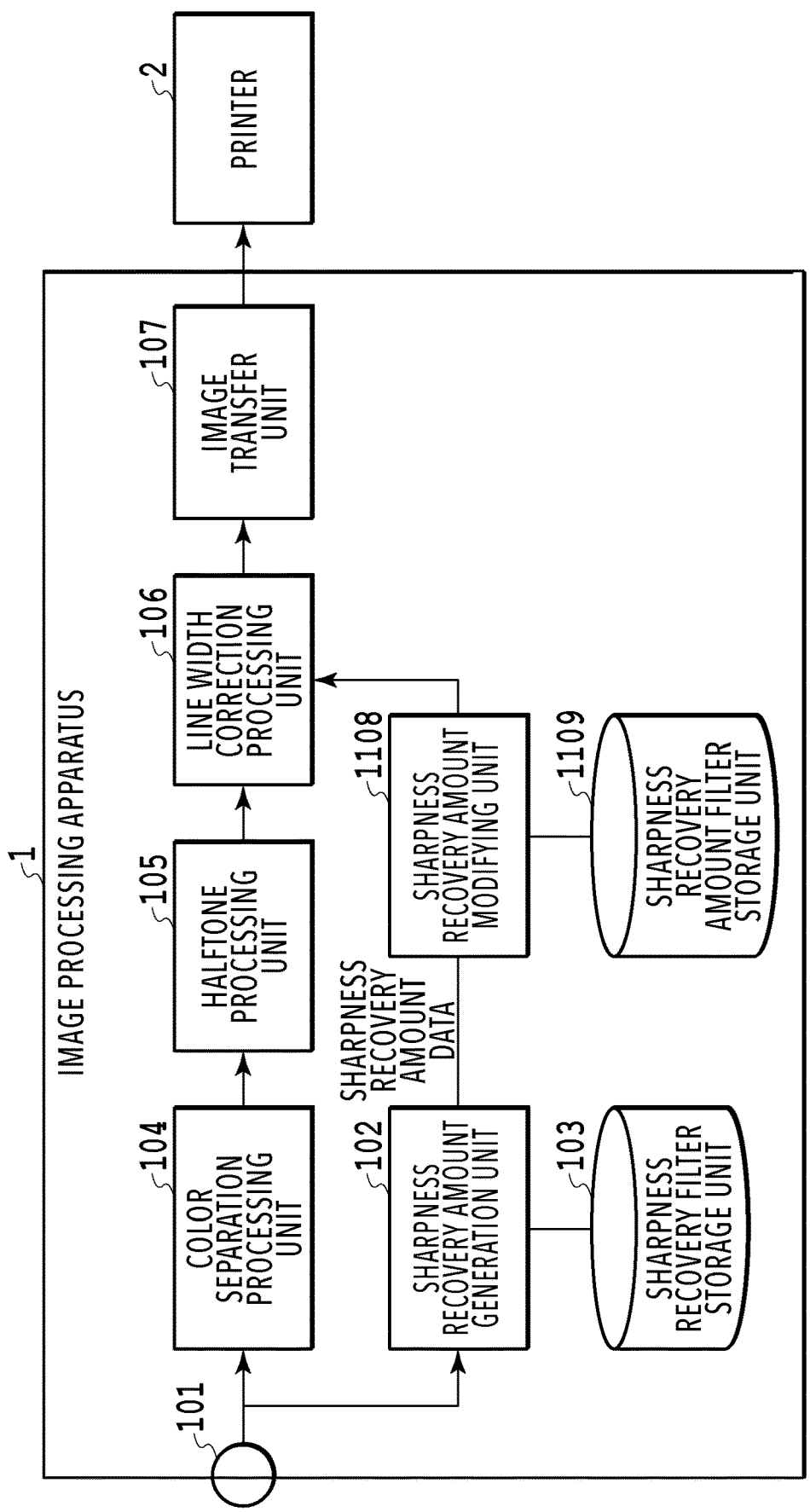
FIG. 11 is a block diagram showing a configuration of an image processing apparatus according to a third embodiment of the present invention.

FIG. 11 is a block diagram showing a configuration of an image processing apparatus according to the third embodiment of the present invention. A sharpness recovery amount modifying unit 1108 modifies input sharpness recovery amount data. At the time of modifying the sharpness recovery amount data, the sharpness recovery amount modifying unit 1108 refers to a one-dimensional lookup table (LUT) stored in a sharpness recovery amount modifying LUT storage unit 1109. Then, in this sharpness recovery amount modifying lookup table, a modification value of the sharpness recovery amount is set in advance so that priority is given to the negative sharpness recovery amount over the positive sharpness recovery amount for the input sharpness recovery amount data.

Figure 12:
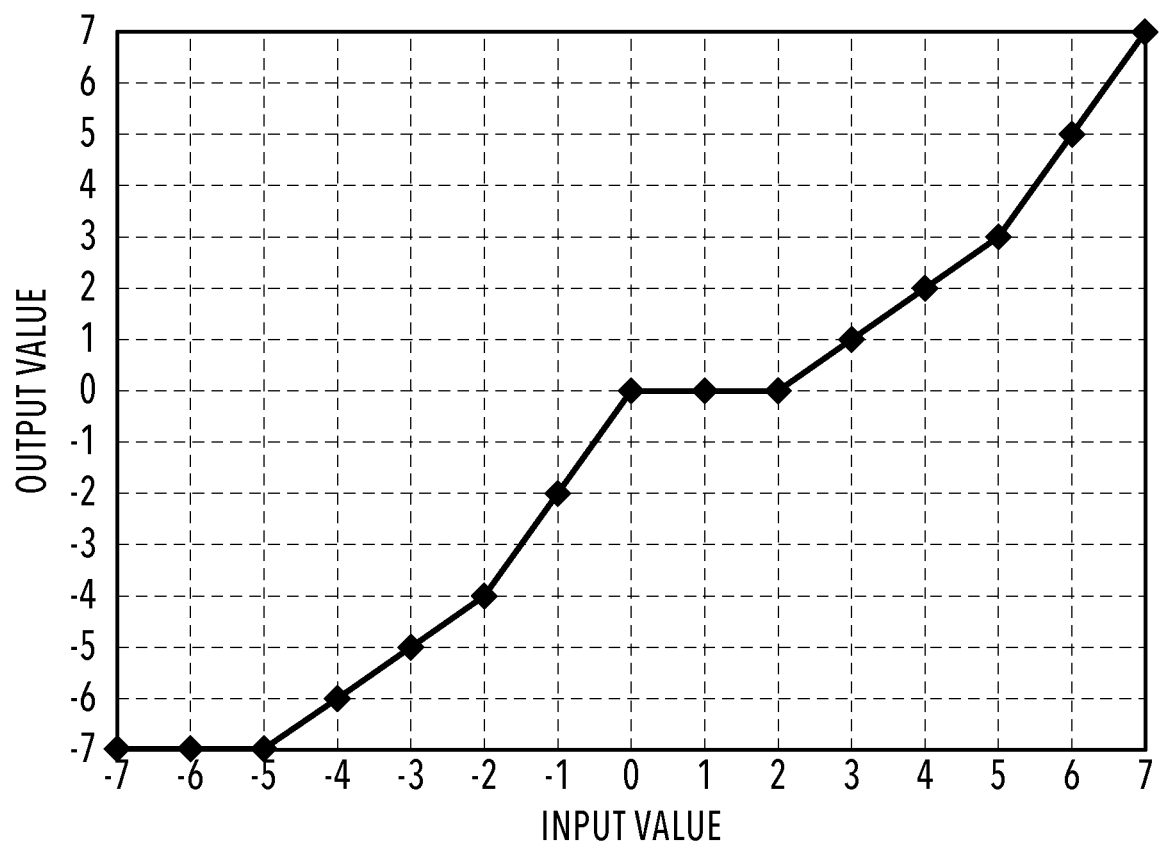
FIG. 12 is a diagram showing an example of a sharpness recovery amount modifying lookup table.

FIG. 12 is an example of the sharpness recovery amount modifying lookup table. In the sharpness recovery amount modifying lookup table in the present embodiment, for an input of sharpness recovery amount data including one of pixel values −7 to 7, an output of one of −7 to 7 is produced. Then, at this time, the lookup table is set so that the absolute value of the negative sharpness recovery amount becomes larger than the absolute value of the positive sharpness recovery amount in the case where the absolute values of the positive and negative sharpness recovery amounts of the input data are the same. That is, the lookup table is set so that priority is given to the negative sharpness recovery amount over the positive sharpness recovery amount for the input sharpness recovery amount data.

As explained above, according to the third embodiment, the sharpness recovery amount is modified so that priority is given to reproduction of a solid-white line. Due to this, even in the case where a black line is printed thick and a solid-white line is printed thin compared to the digital image, it is possible to appropriately improve sharpness also for an input image including a complex-shaped character, line drawing, or the like with a simple configuration compared to the conventional method of extracting a line width.

In the present embodiment, the example is explained in which the sharpness recovery amount modifying lookup table is held in advance, but the calculation method of a modification value is not necessarily limited to this. Consequently, for example, it may also be possible to find a correction amount by using a function or the like which performs correction so that priority is given to the negative recovery amount over the positive recovery amount.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

By the present invention, it is possible to appropriately improve sharpness also for an input image including a complex shape with a configuration with less processing load compared to a conventional method of detecting a line width in image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-112720, filed Jun. 7, 2017, which is hereby incorporated by reference wherein in its entirety.

What is claimed is:

1. An image processing apparatus comprising:
   one or more processors; and
   one or more memories storing instructions, when executed by the one or more processors, causing the image processing apparatus to function as:
      a generation unit configured to generate a sharpness recovery amount for recovering degradation of a spatial frequency response, the sharpness recovery amount corresponding to each pixel of a target image; and a correction unit configured to perform correction processing for the target image based on the sharpness recovery amount between adjacent pixels of the target image, wherein the correction unit adds a correction amount of a sign opposite to a sign of a sharpness recovery amount to a pixel with the smaller absolute value of the sharpness recovery amount in a case where signs of the sharpness recovery amounts reverse between the adjacent pixels, adds, in a case where an absolute value of a pixel whose sign of the sharpness recovery amount is positive is larger than an absolute value of a negative pixel, a predetermined correction amount to a pixel located at the negative pixel; and adds, in a case where an absolute value of a pixel whose sign of the sharpness recovery amount is positive is smaller than an absolute value of a negative pixel, a predetermined correction amount to a pixel located at the positive pixel.

2. The image processing apparatus according to claim 1, wherein
the correction unit calculates the predetermined correction amount based on a sum value of sharpness recovery amounts between adjacent pixels of the target image.

3. The image processing apparatus according to claim 1, wherein the one or more memories storing instructions, when executed by the one or more processors, causes the image processing apparatus to further function as:
a halftone processing unit configured to generate a halftone image and exposure position information specifying justification of an exposure position of each pixel from the target image, wherein
the correction unit corrects exposure position information so as to link with a turned-on pixel of an adjacent pixel in a case where signs of the sharpness recovery amounts reverse between adjacent pixels of the target image and at least one of two pixels of a halftone image located at the same position of the adjacent pixel is an exposure pixel.

4. The image processing apparatus according to claim 1, wherein
the generation unit generates the sharpness recovery amount by performing a convolution operation for a luminance value or RGB values of the target image by using filter coefficients calculated in accordance with the spatial frequency response.

5. A non-transitory computer readable storage medium storing a program for causing a computer to function as an image processing apparatus,
the image processing apparatus comprising:
one or more processors; and
one or more memories storing instructions, when executed by the one or more processors, causing the image processing apparatus to function as:
a generation unit configured to generate a sharpness recovery amount for recovering degradation of a spatial frequency response, the sharpness recovery amount corresponding to each pixel of a target image; and a correction unit configured to perform correction processing for the target image based on the sharpness recovery amount, wherein the correction unit adds a correction amount of a sign opposite to a sign of a sharpness recovery amount between adjacent pixels of the target image to a pixel with the smaller absolute value of the sharpness recovery amount in a case where signs of the sharpness recovery amounts reverse between the adjacent pixels, adds, in a case where an absolute value of a pixel whose sign of the sharpness recovery amount is positive is larger than an absolute value of a negative pixel, a predetermined correction amount to a pixel located at the negative pixel; and adds, in a case where an absolute value of a pixel whose sign of the sharpness recovery amount is positive is smaller than an absolute value of a negative pixel, a predetermined correction amount to a pixel located at the positive pixel.

6. An image processing method comprising:
a generation step of generating, by a generation unit, a sharpness recovery amount for recovering degradation of a spatial frequency response, the sharpness recovery amount corresponding to each pixel of a target image; and
a correction step of performing, by a correction unit, correction processing for the target image based on the sharpness recovery amount, wherein
at the correction step,
adds a correction amount of a sign opposite to a sign of a sharpness recovery amount between adjacent pixels of the target image to a pixel with the smaller absolute value of the sharpness recovery amount in a case where signs of the sharpness recovery amounts reverse between the adjacent pixels,
adds, in a case where an absolute value of a pixel whose sign of the sharpness recovery amount is positive is larger than an absolute value of a negative pixel, a predetermined correction amount to a pixel located at the negative pixel; and
adds, in a case where an absolute value of a pixel whose sign of the sharpness recovery amount is positive is smaller than an absolute value of a negative pixel, a predetermined correction amount to a pixel located at the positive pixel.

7. The image processing method according to claim 6, wherein
at the correction step, the predetermined correction amount is calculated based on a sum value of sharpness recovery amounts between adjacent pixels of the target image.

8. The image processing method according to claim 6, comprising:
a halftone processing step of generating, by a halftone processing unit, a halftone image and exposure position information specifying justification of an exposure position of each pixel from the target image, wherein
at the correction step, exposure position information is corrected so as to link with a turned-on pixel of an adjacent pixel in a case where signs of the sharpness recovery amounts reverse between adjacent pixels of the target image and at least one of two pixels of a halftone image located at the same position of the adjacent pixel is an exposure pixel.

9. The image processing method according to claim 6, wherein at the generation step, the sharpness recovery amount is generated by performing a convolution operation for a luminance value or RGB values of the target image by using filter coefficients calculated in accordance with the spatial frequency response.

10. An image forming apparatus comprising:

an image processing apparatus comprising: one or more processors; and one or more memories storing instructions, when executed by the one or more processors, causing the image processing apparatus to function as:

a generation unit configured to generate a sharpness recovery amount for recovering degradation of a spatial frequency response, the sharpness recovery amount corresponding to each pixel of a target image; and a correction unit configured to perform correction processing for the target image based on the sharpness recovery amount, wherein the correction unit adds a correction amount of a sign opposite to a sign of a sharpness recovery amount to a pixel with the smaller absolute value of the sharpness recovery amount between adjacent pixels of the target image in a case where signs of the sharpness recovery amounts reverse between the adjacent pixels; and an image output unit configured to output an image relating to image data for which image processing has been performed by the image processing apparatus, and wherein the correction unit adds, in a case where an absolute value of a pixel whose sign of the sharpness recovery amount is positive is larger than an absolute value of a negative pixel, a predetermined correction amount to a pixel located at the negative pixel; and adds, in a case where an absolute value of a pixel whose sign of the sharpness recovery amount is positive is smaller than an absolute value of a negative pixel, a predetermined correction amount to a pixel located at the positive pixel.

11. The image forming apparatus according to claim 10, wherein the correction unit calculates the predetermined correction amount based on a sum value of sharpness recovery amounts between adjacent pixels of the target image.

12. The image forming apparatus according to claim 10, wherein the one or more memories storing instructions, when executed by the one or more processors, causes the image processing apparatus to further function as:

a halftone processing unit configured to generate a halftone image and exposure position information specifying justification of an exposure position of each pixel from the target image, wherein the correction unit corrects exposure position information so as to link with a turned-on pixel of an adjacent pixel in a case where signs of the sharpness recovery amounts reverse between adjacent pixels of the target image and at least one of two pixels of a halftone image located at the same position of the adjacent pixel is an exposure pixel.

13. The image forming apparatus according to claim 10, wherein the generation unit generates the sharpness recovery amount by performing a convolution operation for a luminance value or RGB values of the target image by using filter coefficients calculated in accordance with the spatial frequency response.

* * * * *